United States Patent
Obayashi

(10) Patent No.: US 12,403,864 B2
(45) Date of Patent: Sep. 2, 2025

(54) VEHICLE CONTROL DEVICE, VEHICLE CONTROL METHOD, AND STORAGE MEDIUM STORING VEHICLE CONTROL PROGRAM

(71) Applicant: DENSO CORPORATION, Kariya (JP)

(72) Inventor: Hironori Obayashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 301 days.

(21) Appl. No.: 18/319,306

(22) Filed: May 17, 2023

(65) Prior Publication Data

US 2023/0286467 A1    Sep. 14, 2023

Related U.S. Application Data

(63) Continuation of application No. PCT/JP2021/036582, filed on Oct. 4, 2021.

(30) Foreign Application Priority Data

Nov. 19, 2020   (JP) ................. 2020-192579

(51) Int. Cl.
  *B60S 1/08* (2006.01)
  *B60S 1/52* (2006.01)
(52) U.S. Cl.
  CPC .............. *B60S 1/0818* (2013.01); *B60S 1/52* (2013.01)
(58) Field of Classification Search
  None
  See application file for complete search history.

(56) References Cited

U.S. PATENT DOCUMENTS

| | | |
|---|---|---|
| 10,099,630 B1 | 10/2018 | Krishnan et al. |
| 10,173,646 B1* | 1/2019 | Rice ................... B60S 1/485 |
| 2019/0092287 A1* | 3/2019 | Leach .................. B60S 1/56 |
| 2019/0283729 A1 | 9/2019 | Ikebata et al. |
| 2019/0286159 A1 | 9/2019 | Terada |
| 2020/0001331 A1* | 1/2020 | Deane .................. B60S 1/487 |
| 2020/0207312 A1 | 7/2020 | Kamiya et al. |
| 2020/0231125 A1* | 7/2020 | Wakamiya ........... G05D 1/0088 |
| 2021/0039670 A1* | 2/2021 | Sakai .................... B60W 50/14 |
| 2021/0070275 A1 | 3/2021 | Ikebata et al. |
| 2024/0144697 A1* | 5/2024 | Toth ..................... G01S 17/931 |

* cited by examiner

*Primary Examiner* — Amelia Vorce
(74) *Attorney, Agent, or Firm* — MASCHOFF BRENNAN

(57) ABSTRACT

External sensors of a vehicle are individually set with sensing regions through external surfaces. Cleaning nozzles of the vehicle inject cleaning fluid to individually clean the external surfaces of the external sensors. An injection control unit performs classification of the cleaning nozzles, which correspond to the external surfaces whose sensing regions of the external sensors overlap with each other, into an injected nozzle, which performs injection of cleaning fluid and a stopped nozzle, which stops injection of cleaning fluid, and controls the classification according to a stain state of the external surface. A priority control unit controls a priority of cleaned sensor data, which is acquired through the external sensor whose external surface corresponds to the injected nozzle, to be lower than a priority of non-cleaned sensor data, which is acquired through the external sensor whose external surface corresponds to the stopped nozzle.

10 Claims, 12 Drawing Sheets

VEHICLE CONTROL DEVICE, VEHICLE CONTROL METHOD, AND STORAGE MEDIUM STORING VEHICLE CONTROL PROGRAM

CROSS REFERENCE TO RELATED APPLICATION

The present application is a continuation application of International Patent Application No. PCT/JP2021/036582 filed on Oct. 4, 2021, which designated the U. S. and claims the benefit of priority from Japanese Patent Application No. 2020-192579 filed in Japan filed on Nov. 19, 2020, the entire disclosure of the above application is incorporated herein by reference.

TECHNICAL FIELD

The present disclosure relates to a vehicle control device, a vehicle control method, and a storage medium storing a vehicle control program.

BACKGROUND

Conventionally, multiple external sensors are installed as a sensor system in a vehicle. In the external sensors, sensing regions are individually set through external surfaces.

SUMMARY

According to an aspect of the present disclosure, a vehicle includes a plurality of external sensors, as a sensor system, in which sensing regions are individually set through external surfaces. The vehicle includes, as a cleaning system, a plurality of cleaning nozzles configured to inject cleaning fluid to individually clean the external surfaces of the external sensors.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
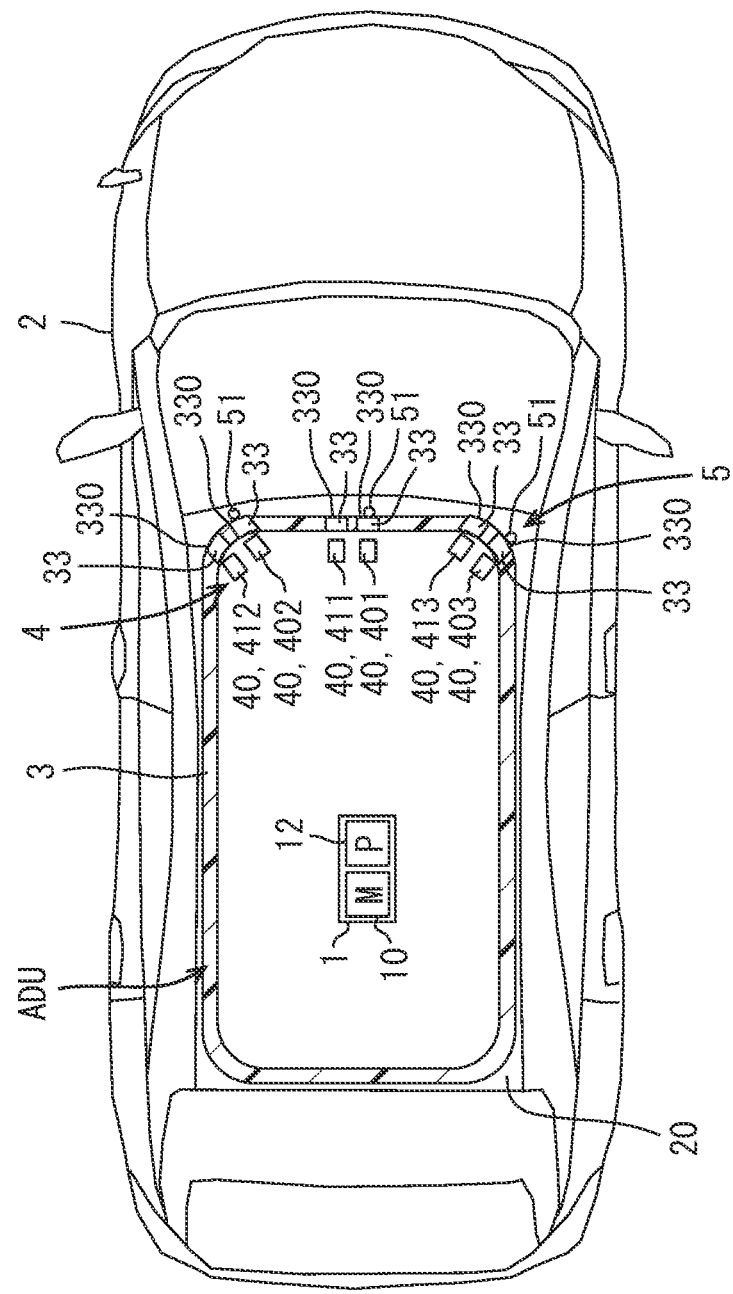
FIG. 1 is a configuration diagram in a cross section showing a state in which an autonomous driving unit according to a first embodiment is mounted on a vehicle.

According to an example of the present disclosure, multiple external sensors are installed as a sensor system in a vehicle. In the external sensors, sensing regions are individually set through external surfaces. The vehicle is equipped with a cleaning system that includes a plurality of cleaning nozzles to individually inject cleaning fluid thereby to clean the external surfaces of the external sensors.

Assuming, in this example, cleaning liquid is injected as the cleaning fluid from the cleaning nozzles and may adhere to the external surfaces. Due to the adhered cleaning fluid, there is a concern that a sensing accuracy of the external sensors may be influenced during the cleaning of the external surfaces. The injection of the cleaning fluid from the cleaning nozzles to the external surfaces causes liquid, such as rain, to flow on the external surface. Due to the liquid, there is a concern that a sensing accuracy of the external sensors may be influenced during the cleaning of the external surfaces. In recent years, in an autonomous driving control mode of a vehicle, decrease in the sensing accuracy may lead to decrease in the accuracy of an autonomous driving control and is not desirable.

According to a first aspect of the present disclosure, a control device is for a vehicle. The vehicle includes, as a sensor system, a plurality of external sensors individually set with sensing regions through external surfaces. The vehicle includes, as a cleaning system, a plurality of cleaning nozzles configured to inject cleaning fluid to individually clean the external surfaces of the external sensors. The control device comprises: an injection control unit configured to perform classification of the cleaning nozzles, which correspond to the external surfaces whose sensing regions of the external sensors overlap with each other, into an injected nozzle, which performs injection of the cleaning fluid and a stopped nozzle, which stops injection of the cleaning fluid and control the classification according to a stain state of the external surface; and a priority control unit configured to control a priority of cleaned sensor data, which is acquired through an external sensor of the external sensors whose external surface corresponds to the injected nozzle, to be lower than a priority of non-cleaned sensor data, which is acquired through an external sensor of the external sensors whose external surface corresponds to the stopped nozzle.

According to a second aspect of the present disclosure, a control method is for a vehicle. The vehicle includes, as a sensor system, a plurality of external sensors individually set with sensing regions through external surfaces. The vehicle includes, as a cleaning system, a plurality of cleaning nozzles configured to inject cleaning fluid to individually clean the external surfaces of the external sensors. The control method comprises: performing classification of the cleaning nozzles, which correspond to the external surfaces whose sensing regions of the external sensors overlap with each other, into an injected nozzle, which performs injection of the cleaning fluid and a stopped nozzle, which stops injection of the cleaning fluid and controlling the classification according to a stain state of the external surface in an injection control process; and controlling a priority of cleaned sensor data, which is acquired through an external sensor of the external sensors whose external surface corresponds to the injected nozzle, to be lower than a priority of non-cleaned sensor data, which is acquired through an external sensor of the external sensors whose external surface corresponds to the stopped nozzle, in a priority control process.

According to a third aspect of the present disclosure, a storage medium stores a control program for a vehicle. The vehicle includes, as a sensor system, a plurality of external sensors individually set with sensing regions through external surfaces. The vehicle includes, as a cleaning system, a plurality of cleaning nozzles configured to inject cleaning fluid to individually clean the external surfaces of the external sensors. The control program includes instructions to be executed by a processor. The instructions comprises: performing classification of the cleaning nozzles, which correspond to the external surfaces whose sensing regions of the external sensors overlap with each other, into an injected nozzle, which performs injection of the cleaning fluid and a stopped nozzle, which stops injection of the cleaning fluid and controlling the classification according to a stain state of the external surface in an injection control process; and controlling a priority of cleaned sensor data, which is acquired through an external sensor of the external sensors whose external surface corresponds to the injected nozzle, to be lower than a priority of non-cleaned sensor data, which is acquired through an external sensor of the external sensors whose external surface corresponds to the stopped nozzle, in a priority control process.

In the first to third aspects, among the cleaning nozzles corresponding to the external surfaces of which the sensing regions of the external sensors overlap with each other, the classification into the injected nozzle, which performs injection of the cleaning fluid, and the stopped nozzle, which stops injection of the cleaning fluid, is controlled according to the stain state of the external surfaces. Therefore, the priority of the cleaned sensor data, which is acquired through an external sensor of the external sensors whose external surface corresponds to the injected nozzle, is controlled to be lower than the priority of the non-cleaned sensor data, which is acquired through an external sensor of the external sensors whose external surface corresponds to the stopped nozzle. According to the priority control, it is possible to prevent the external sensor, which corresponds to the external surface being cleaned with the cleaning fluid, from influencing a sensing accuracy of the sensor system as a whole. The above configuration enables to ensure the sensing accuracy of the sensor system as a whole by balancing the sensing and the cleaning.

According to a fourth aspect of the present disclosure, a control device is for a vehicle. The vehicle includes: a plurality of external sensors, as a sensor system, in which sensing regions are individually set through external surfaces; and a plurality of cleaning nozzles, as a cleaning system, configured to inject cleaning fluid to individually clean the external surfaces of the external sensors. The control device comprises: a priority control unit configured to control a priority according to a driving state of the vehicle for each sensor data acquired through the external sensor; and an injection control unit configured to perform classification of the external sensors into a high priority sensor whose sensor data has a high priority and a low priority sensor whose sensor data has a low priority, stop injection of the cleaning fluid from the cleaning nozzle corresponding to the external surface of the high priority sensor, and perform injection of the cleaning fluid from the cleaning nozzle corresponding to the external surface of the low priority sensor.

According to a fifth aspect of the present disclosure, a control method is for a vehicle. The vehicle includes, as a sensor system, a plurality of external sensors individually set with sensing regions through external surfaces. The vehicle includes, as a cleaning system, a plurality of cleaning nozzles configured to inject cleaning fluid to individually clean the external surfaces of the external sensors. The control method comprises: controlling a priority according to a driving state of the vehicle for each sensor data acquired through an external sensor of the external sensors in a priority control process; and classifying the external sensors into a high priority sensor whose sensor data has a high priority and a low priority sensor whose sensor data has a low priority, stop injection of the cleaning fluid from the cleaning nozzle corresponding to the external surface of the high priority sensor, and performing injection of the cleaning fluid from the cleaning nozzle corresponding to the external surface of the low priority sensor in an injection control process.

According to a sixth aspect of the present disclosure, a storage medium stores a control program is for a vehicle. The vehicle includes, as a sensor system, a plurality of external sensors individually set with sensing regions through external surfaces. The vehicle includes, as a cleaning system, a plurality of cleaning nozzles configured to inject cleaning fluid to individually clean the external surfaces of the external sensors. The control program includes instructions to be executed by a processor. The instructions comprises: controlling a priority according to a driving state of the vehicle for each sensor data acquired through an external sensor of the external sensors in a priority control process; and classifying the external sensors into a high priority sensor whose sensor data has a high priority and a low priority sensor whose sensor data has a low priority, stopping injection of the cleaning fluid from the cleaning nozzle corresponding to the external surface of the high priority sensor, and performing injection of the cleaning fluid from the cleaning nozzle corresponding to the external surface of the low priority sensor in an injection control process.

In these fourth to sixth aspects, the priority is controlled according to the driving state of the vehicle for each sensor data acquired through the external sensor. In this way, the priority P becomes an index for classifying the external sensors. Injection of the cleaning fluid is stopped for the cleaning nozzle corresponding to the external surface of the high priority sensor, which is assigned with the priority of the sensor data that is high. Injection of the cleaning fluid is performed for the cleaning nozzle corresponding to the external surface of the low priority sensor, which is assigned with the priority of the sensor data that is low. According to the injection control, it is possible to avoid the low priority sensor, which corresponds to the external surface being cleaned with the cleaning fluid, from influencing the sensing accuracy of the sensor system as a whole. The above configuration enables to ensure high sensing accuracy of the sensor system as a whole by balancing the sensing and the cleaning.

Hereinafter, embodiments will be described with reference to the drawings. In the following description, the same reference symbols are assigned to corresponding components in each embodiment in order to avoid repetitive descriptions. When only a part of the configuration is described in the respective embodiments, the configuration of the other embodiments described before may be applied to other parts of the configuration. Further, not only the combinations of the configurations explicitly shown in the description of the respective embodiments, but also the configurations of the plurality of embodiments can be partially combined together even if the configurations are not explicitly shown if there is no problem in the combination in particular.

First Embodiment

Figure 2:
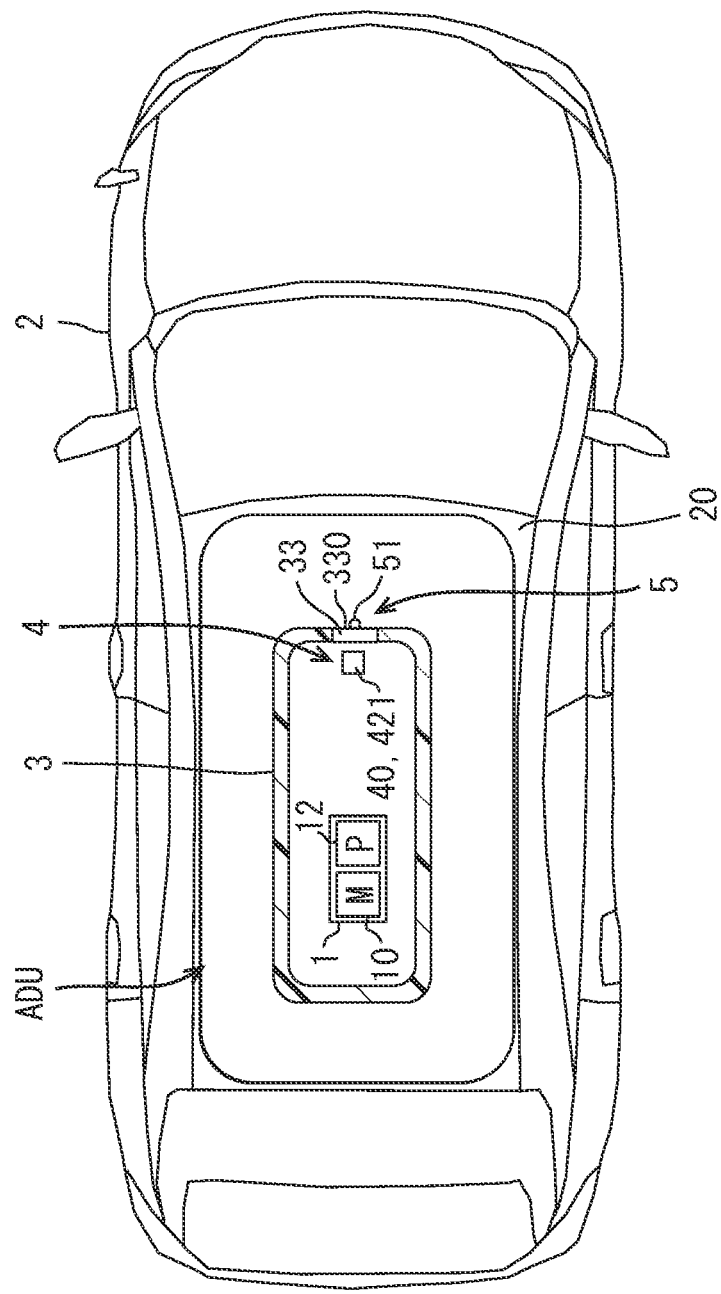
FIG. 2 is a configuration diagram in another cross section showing a state in which the autonomous driving unit according to the first embodiment is mounted on the vehicle.

As shown in FIGS. 1 and 2, an autonomous driving unit ADU provided with a vehicle control device 1 of the first embodiment is mounted on a vehicle 2. The vehicle 2 is capable of executing a constant or temporary autonomous driving in an autonomous driving control mode. Here, the autonomous driving control mode may be achieved with an autonomous operation control, such as conditional driving automation, advanced driving automation, or full driving automation, where the system in operation performs all driving tasks. The autonomous driving control mode may be achieved with an advanced driving assistance control, such as driving assistance or partial driving automation, where the occupant performs some or all driving tasks. The autonomous driving control mode may be achieved by combining or switching between the autonomous driving control and the advanced driving assistance control.

Figure 3:
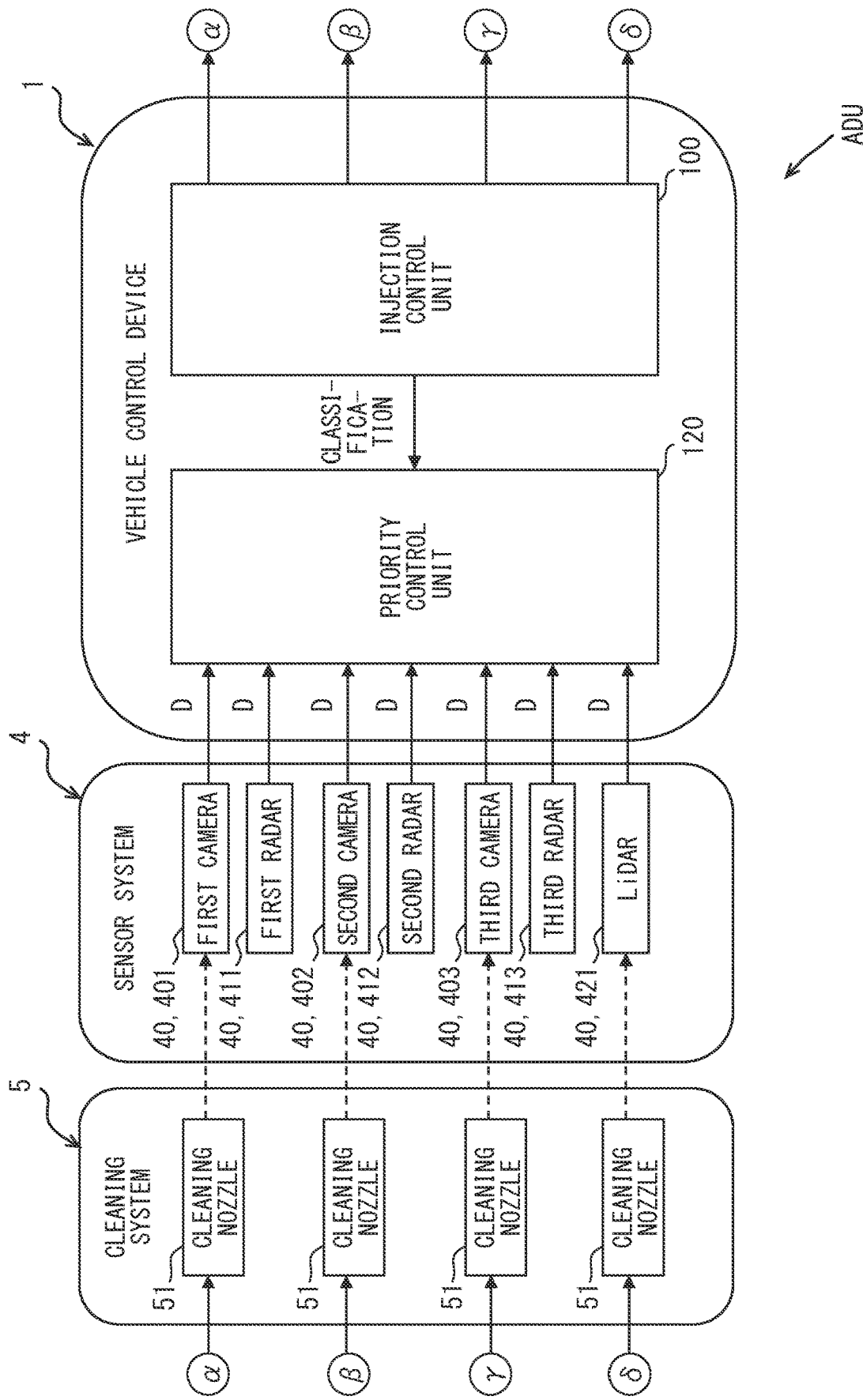
FIG. 3 is a block diagram showing a detailed configuration of an autonomous driving unit according to the first embodiment.

As shown in FIGS. 1 to 3, the autonomous driving unit ADU includes the vehicle control device 1, a housing 3, a sensor system 4, and a cleaning system 5. Hereinafter, description regarding the direction of the autonomous driving unit ADU will be made with reference to the vehicle 2 on the horizontal plane.

The housing 3 is made of resin, metal, or a combination thereof, and is formed in, for example, a hollow flat rectangular box shape. The housing 3 is installed on a roof 20 of the vehicle 2. A plurality of openings extend through the outer peripheral wall of the housing 3. The openings are covered with sensor covers 33 such as transparent glass. Each of the sensor covers 33 forms an external surface 330 exposed to the outside of the vehicle 2.

The sensor system 4 is includes a plurality of external sensors 40. The external sensors 40 are accommodated inside the housing 3 correspondingly to the external surfaces 330. Hereinafter, the external surface 330 corresponding to the external sensor 40 is simply referred to as the external surface 330 of the external sensor 40.

Each of the outside sensors 40 acquires sensor data D representing outside information that can be utilized in the autonomous driving control mode in the vehicle 2. Each of the external sensors 40 is composed of one type of, for example, a camera, a LiDAR (Light Detection and Ranging/ Laser Imaging Detection and Ranging), a radar, a sonar, or the like. In particular, the sensor system 4 of the autonomous driving unit ADU includes three types of cameras 401, 402, 403, three types of radars 411, 412, 413, and one type of LiDAR 421.

Figure 4:
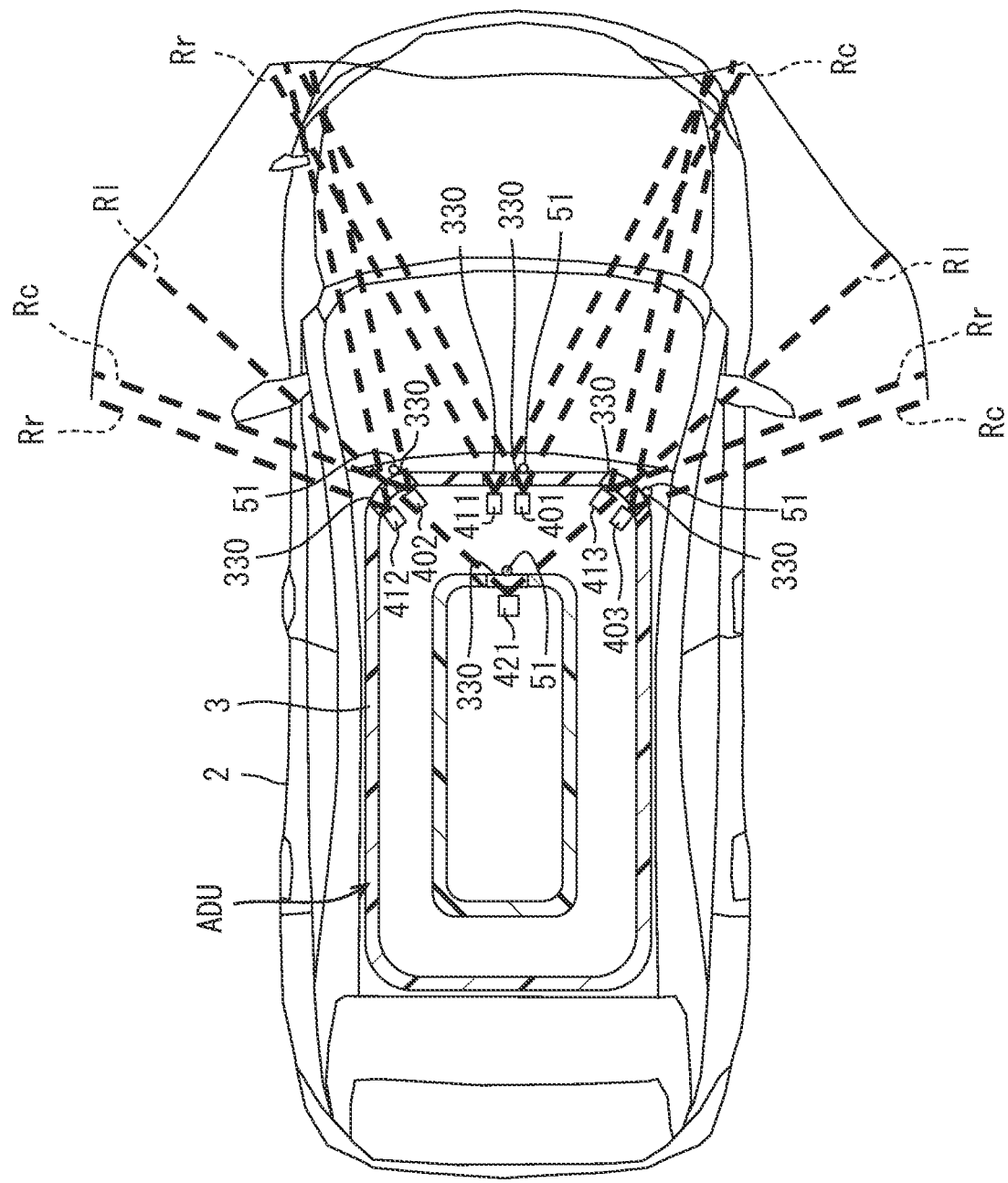
FIG. 4 is a schematic diagram for explaining characteristics of the autonomous driving unit according to the first embodiment.

Each of the cameras 401, 402, and 403 shown in FIGS. 1, 3, and 4 acquires the sensor data D by photographing an optical image incident from the outside. A sensing region Rc of a first camera 401 is set in a front region of the vehicle 2 through the corresponding one of the external surfaces 330. The sensing region Rc of a second camera 402 is set in a diagonally left front region of the vehicle 2 through the corresponding one of the external surfaces 330. The sensing region Rc of a third camera 403 is set in a diagonally right front region of the vehicle 2 through the corresponding one of the external surfaces 330.

Each of the radars 411, 412, and 413 shown in FIGS. 1, 3, and 4 acquires the sensor data D by sensing a reflected wave incident upon irradiation of a millimeter wave to the outside. A sensing region Rr of a first radar 411 is set in a front region of the vehicle 2 through the corresponding one of the external surfaces 330. A sensing region Rr of a second radar 412 is set in a diagonally left front region of the vehicle 2 through the corresponding one of the external surfaces 330. A sensing region Rr of a third radar 413 is set in a diagonally right front region of the vehicle 2 through the corresponding one of the external surfaces 330.

The LiDAR 421 shown in FIGS. 2 to 4 acquires the sensor data D by sensing reflected light incident upon irradiation of laser light to the outside. The sensing region Rl of the LiDAR 421 is set to extend from the front of the vehicle 2 to a diagonally right front region and a diagonally left from region through the corresponding one of the external surfaces 330.

As shown in FIG. 4, in the autonomous driving unit ADU, the sensing region Rc of the first camera 401, the sensing region Rr of the first radar 411, and the sensing region Rl of the LiDAR 421 partially overlap with each other. In the autonomous driving unit ADU, the sensing region Rc of the second camera 402, the sensing region Rr of the second radar 412, and the sensing region Rl of the LiDAR 421 partially overlap with each other. Furthermore, in the autonomous driving unit ADU, the sensing region Rc of the third camera 403, the sensing region Rr of the third radar 413, and the sensing region Rl of the LiDAR 421 partially overlap with each other.

As shown in FIGS. 1 to 4, the cleaning system 5 includes a plurality of cleaning nozzles 51. The cleaning nozzles 51 are held outside the housing 3 correspondingly to the individual external surfaces 330. Accordingly, the cleaning nozzles 51 also correspond to the individual external sensors 40, respectively. In particular, each cleaning nozzle 51 of the autonomous driving unit ADU is installed so as to be able to inject cleaning fluid toward the external surface 330 located in the sensing regions Rc and Rl of the cameras 401, 402, 403 and the LiDAR 420. The cleaning fluid may be cleaning liquid or cleaning gas. The cleaning system 5 may include a wiper so as to be able to individually wipe the external surface 330 to be cleaned by jetting the cleaning fluid. Cleaning of the external surface 330 located in the sensing region Rr of each of the radars 411, 412, 413 is omitted in the autonomous driving unit ADU.

As shown in FIGS. 1 to 3, the vehicle control device 1 is connected to the sensor system 4 and the cleaning system 5 via at least one of LAN (Local region Network), wire harness, internal bus, and the like. The vehicle control device 1 includes at least one dedicated computer. The dedicated computer of the vehicle control device 1 may be an operation control ECU that controls the autonomous driving control mode in cooperation with an ECU (Electronic Control Unit) in the vehicle 2. The dedicated computer of the vehicle control device 1 may be a locator ECU that estimates a state quantity of the vehicle 2 including its own position. The dedicated computer of the vehicle control device 1 may be a navigation ECU that navigates a travel route of the vehicle 2.

The vehicle control device 1 including the dedicated computer includes at least one memory 10 and at least one processor 12 as shown in FIGS. 1 and 2. The memory 10 is at least one type of non-transitory tangible storage medium, such as a semiconductor memory, a magnetic medium, and an optical medium, for non-transitory storage of computer readable programs and data. The processor 12 includes, as a core, at least one type of, for example, a CPU (Central Processing Unit), a GPU (Graphics Processing Unit), an RISC (Reduced Instruction Set Computer) CPU, and the like.

The processor 12 executes multiple instructions included in a vehicle control program stored in the memory 10. Accordingly, the vehicle control device 1 includes a plurality of functional units (that is, functional blocks) for controlling the sensor system 4 and the cleaning system 5. Thus, in the vehicle control device 1, the vehicle control program stored in the memory 10 for controlling the sensor system 4 and the cleaning system 5 causes the processor 12 to execute a plurality of instructions, thereby constituting a plurality of functional units. As shown in FIG. 3, the plurality of functional units of the vehicle control device 1 include an injection control unit 100 and a priority control unit 120.

Figure 5:
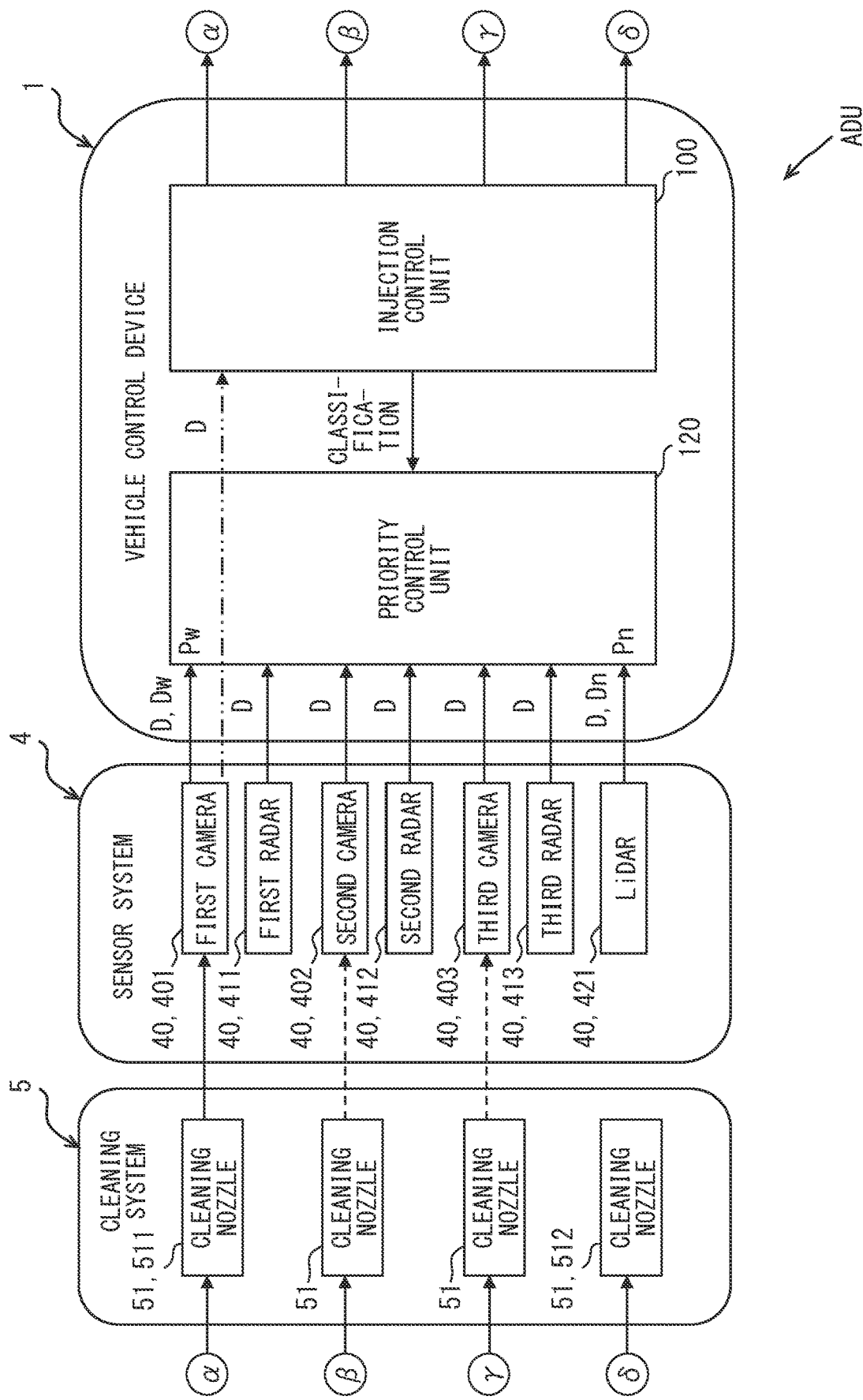
FIG. 5 is a block diagram for explaining functions of the vehicle control device according to the first embodiment.
Figure 6:
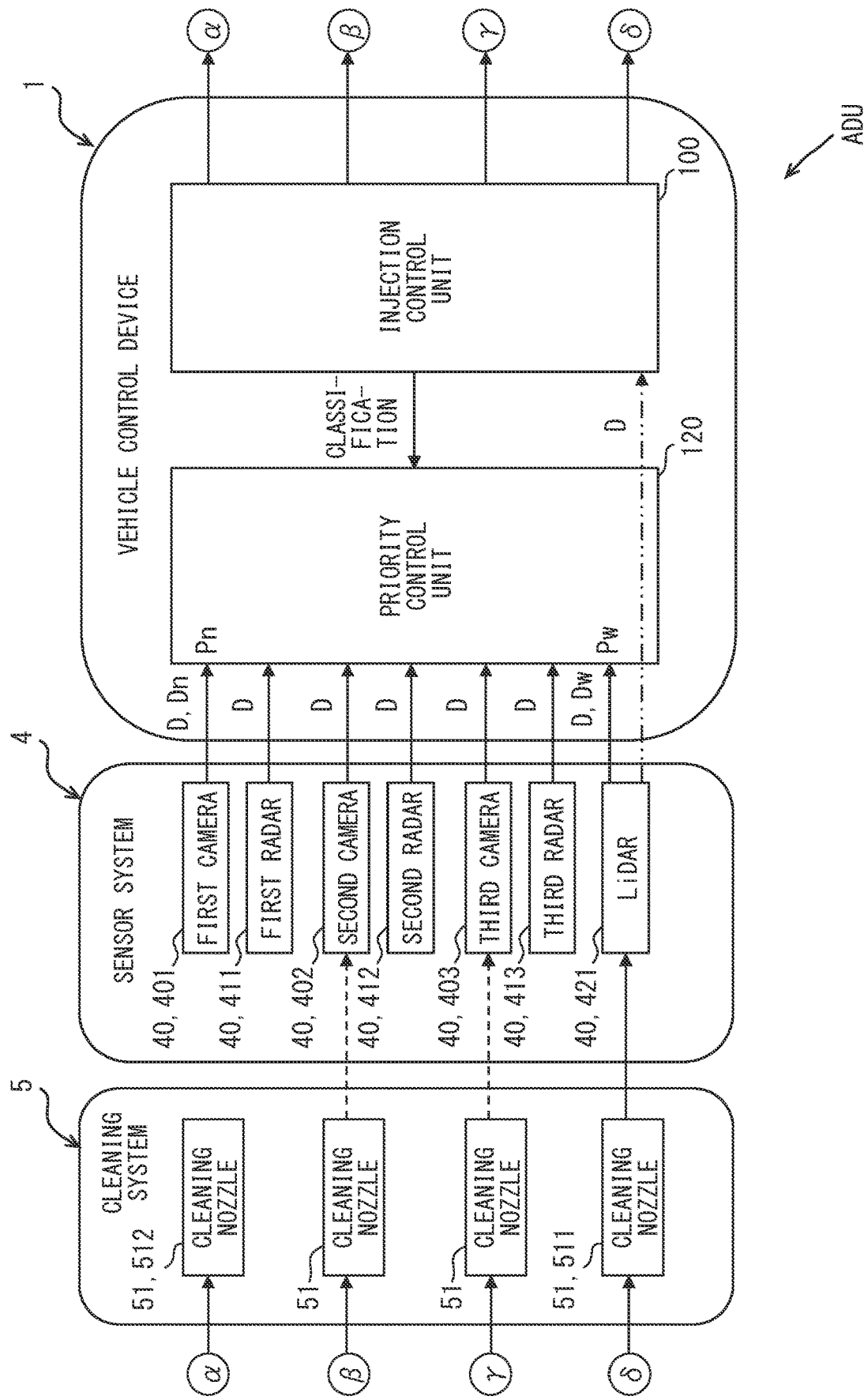
FIG. 6 is a block diagram for explaining functions of the vehicle control device according to the first embodiment.

As shown in FIGS. 5 and 6, the injection control unit 100 classifies the cleaning nozzles 51 corresponding to the external surfaces 330 of the external sensors 40 (excluding the radars 411, 412, and 413 that are not to be cleaned) having overlapping sensing regions Rc and Rl. Specifically, the injection control unit 100 classifies the cleaning nozzles 51 into an injected nozzle 511, which performs injection of the cleaning fluid, and a stopped nozzle 512, which stops the injection of the cleaning fluid. Therefore, the injection control unit 100 controls the classification of the injected nozzle 511 and the stopped nozzle 512 according to, among a stain state of the external surface 330 of the external sensors 40 whose sensing regions Rc and Rl overlap each other and the driving state of the vehicle 2, at least the former stain state.

For example, as shown in FIG. 5, under a condition, in which stain is detected on the external surface 330 of the first camera 401 based on, for example, a change in a recognition rate larger than a threshold of the sensor data D or larger than or equal to the threshold of the sensor data D, the cleaning nozzle 51 corresponding to the first camera 401 is classified into the injected nozzle 511, and the cleaning nozzle 51 corresponding to the LiDAR 421 is classified into the stopped nozzles 512. At this time, it is desirable that a motion state of the vehicle 2 is in a forward motion state. Because, in the forward motion state, even when the priority control unit 120, which will be described later, controls the priority of the sensor data D to be low for some of the external sensors 40 whose sensing regions Rc, Rl (, Rr) are the front region, the autonomous driving control mode can be continued.

On the other hands, for example, as shown in FIG. 6, under a condition, in which stain is detected on the external surface 330 of the LiDAR 421 based on, for example, a change in the recognition rate larger than a threshold of the sensor data D or larger than or equal to the threshold of the sensor data D, the cleaning nozzle 51 corresponding to the LiDAR 421 is classified into the injected nozzle 511, and the cleaning nozzle 51 corresponding to the first camera 401 is classified into the stopped nozzles 512. For the same reason as in the case of FIG. 5, the vehicle 2 at this time is also desirably in the forward motion state.

In this way, the classification between the injected nozzle 511 and the stopped nozzle 512 is controlled. Thus, the injected nozzle 511 continuously or intermittently injects the cleaning fluid onto the corresponding external surface 330. At this time, the injection control unit 100 may variably control an injection amount of the cleaning fluid from the injected nozzle 511.

As shown in FIG. 3, the priority control unit 120 acquires the classification result of the injected nozzle 511 and the stopped nozzle 512 from the injection control unit 100. As shown in FIGS. 5 and 6, the priority control unit 120 acquires the sensor data D through the external sensor 40 whose external surface 330 corresponds to the injected nozzle 511, and defines the acquired data D as cleaned sensor data Dw. Further, the priority control unit 120 acquires the sensor data D through the external sensor 40 whose external surface 330 corresponds to the stopped nozzle 512, and defines the acquired data D as non-cleaned sensor data Dn. Under these definitions, the priority control unit 120 controls a priority Pw of the cleaned sensor data Dw, which is acquired through the external sensor 40 corresponding to the injected nozzle 511, to be lower than a priority Pn of the non-cleaned sensor data Dn, which is acquired through the external sensor 40 corresponding to the stopped nozzle 512. At this time, the priority control unit 120 may control the priority Pw of the cleaned sensor data Dw to zero (for example, 0%) and may control the priority Pn of the non-cleaned sensor data Dn to be higher than zero (for example, 100%).

For example, under the condition shown in FIG. 5, the priority Pn of the non-cleaned sensor data Dn, which is acquired through the LiDAR 421 corresponding to the stopped nozzle 512, is set to a value such as 100%. Accordingly, the priority Pw of the cleaned sensor data Dw, which is acquired through the first camera 401 corresponding to the injected nozzle 511, is set to a value less than 100%, such as 0%. With these settings, the priority Pw of the cleaned sensor data Dw, which is acquired through the first camera 401 of which the external surface 330 is being cleaned, is controlled lower than the priority Pn of the non-cleaned sensor data Dn, which is acquired through the LiDAR 421 of which the cleaning of the external surface 330 is being stopped.

On the other hand, for example, under the conditions shown in FIG. 6, the priority Pn of the non-cleaned sensor data Dn, which is acquired through the first camera 401 corresponding to the stopped nozzle 512, is set to a value, such as 100%. Accordingly, the priority Pw of the cleaned sensor data Dw, which is acquired through the LiDAR 421 corresponding to the injected nozzle 511, is set to a value less than 100%, such as 0%. With these settings, the priority Pw of the cleaned sensor data Dw, which is acquired through the LiDAR 421 of which the external surface 330 is being cleaned, is controlled to be lower than the priority Pn of the non-cleaned sensor data Dn, which is acquired through the first camera 401 of which the external surface 330 is being stopped.

In this way, the priority Pw of the cleaned sensor data Dw and the priority Pn of the non-cleaned sensor data Dn are controlled. Thus, in the autonomous driving control mode, the non-cleaned sensor data Dn corresponding to the stopped nozzle 512 is utilized with priority over the cleaned sensor data Dw corresponding to the injected nozzle 511. At this time, the priorities Pw and Pn can also be considered to be contributions of the sensor data Dw and Dn in the autonomous driving control mode. That is, in the autonomous driving control mode, the contribution of the cleaned sensor data Dw is lower than the contribution of the non-cleaned sensor data Dn. In particular, the contribution of the cleaned sensor data Dw, the priority Pw of which is controlled to be zero, to the autonomous driving control mode is also zero.

In this way, utilization of the cleaned sensor data Dw is regulated, or the cleaned sensor data Dw is discarded.

Figure 7:
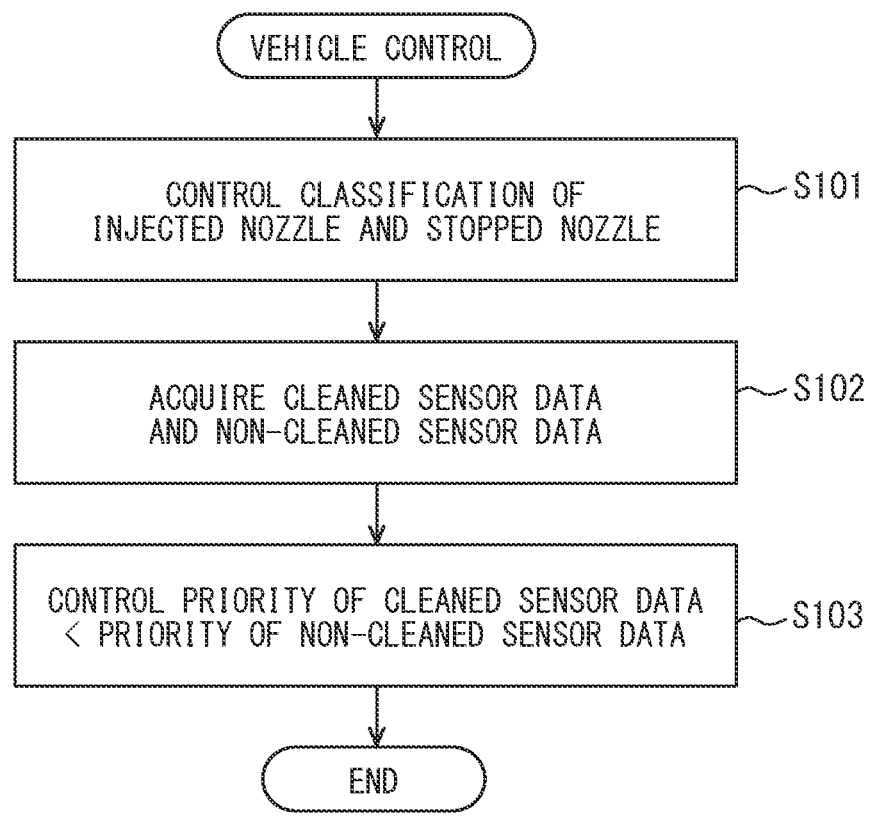
FIG. 7 is a flow chart showing a vehicle control method according to the first embodiment.

The vehicle control device 1 controls the sensor system 4 and the cleaning system 5 with the cooperation of the injection control unit 100 and the priority control unit 120 as described above. A flow of the vehicle control method of this control will be described below with reference to FIG. 7. This flow is repeatedly executed when the vehicle 2 is in an activated state. Each "S" in this flow represents a plurality of steps executed by a plurality of instructions included in the vehicle control program of the first embodiment.

In S101, the injection control unit 100 classifies the cleaning nozzles 51, which correspond to the respective external surfaces 330 of which the sensing regions Rc and RI of the external sensors 40 overlap with each other, into the injected nozzle 511 that performs injection of the cleaning fluid and the stopped nozzle 512 that stops injection of the cleaning fluid. At this time, the injection control unit 100 controls the classification between the injected nozzle 511 and the stopped nozzle 512 according to at least the stain state of the external surfaces 330 of which the sensing regions Rc and RI of the external sensors 40 overlap with each other.

In S102, the priority control unit 120 acquires the cleaned sensor data Dw, which is acquired through the external sensor 40 of the external surface 330 that corresponds to the injected nozzle 511, and the non-cleaned sensor data Dn, which is acquired through the external sensor 40 of the external surface 330 that corresponds to the stopped nozzle 512. Furthermore, in S103, the priority control unit 120 controls the priority Pw of the cleaned sensor data Dw, which is acquired through the external sensor 40 corresponding to the injected nozzle 511, to be lower than the priority Pn of the non-cleaned sensor data Dn, which is acquired through the external sensor 40 corresponding to the stopped nozzle 512. It is noted that, in a case where the priority Pw of the cleaned sensor data Dw, which is acquired through the external sensor 40 corresponding to the stopped nozzle 512, is controlled to zero in S103, acquisition of the cleaned sensor data Dw may be canceled in advance in S102.

In the first embodiment, S101 corresponds to an injection control process, and S102 and S103 correspond to a priority control process.

(Operation Effect)

The operation and effects of the first embodiment described above will be described below.

In the first embodiment, among the cleaning nozzles 51 corresponding to the external surfaces 330 of which the sensing regions Rc and RI of the external sensors 40 overlap with each other, the classification into the injected nozzle 511, which performs injection of the cleaning fluid, and the stopped nozzle 512, which stops injection of the cleaning fluid, is controlled according to the stain state of the external surfaces 330. The priority Pw of the cleaned sensor data Dw, which is acquired through the external sensor 40 of the external surface 330 that corresponds to the injected nozzle 511, is controlled to be lower than the priority Pn of the non-cleaned sensor data Dn, which is acquired through the external sensor 40 of the external surface 330 that corresponds to the stopped nozzle 512. According to the priority control, it is possible to prevent the external sensor 40, which corresponds to the external surface 330 being cleaned with the cleaning fluid, from influencing a sensing accuracy of the sensor system 4 as a whole. The above configuration enables to ensure the sensing accuracy of the sensor system 4 as a whole by balancing the sensing and the cleaning.

According to the first embodiment, when the priority Pw of the cleaned sensor data Dw is controlled to zero, it is possible to prevent the external sensor 40, which corresponds to the external surface 330 being cleaned with the cleaning fluid, from influencing the sensing accuracy of the sensor system 4 as a whole. Therefore, it is possible to ensure high sensing accuracy of the sensor system 4 as a whole.

According to the first embodiment, in the autonomous driving control mode of the vehicle 2, the priorities Pw and Pn of the sensor data Dw and Dn, which are acquired through the external sensors 40 whose sensing regions Rc and RI overlap each other, are controlled. Therefore, in the first embodiment, with the configuration described above, the sensing accuracy of the entire sensor system 4 can be ensured, and the accuracy of the autonomous driving control can also be ensured.

Second Embodiment

Figure 8:
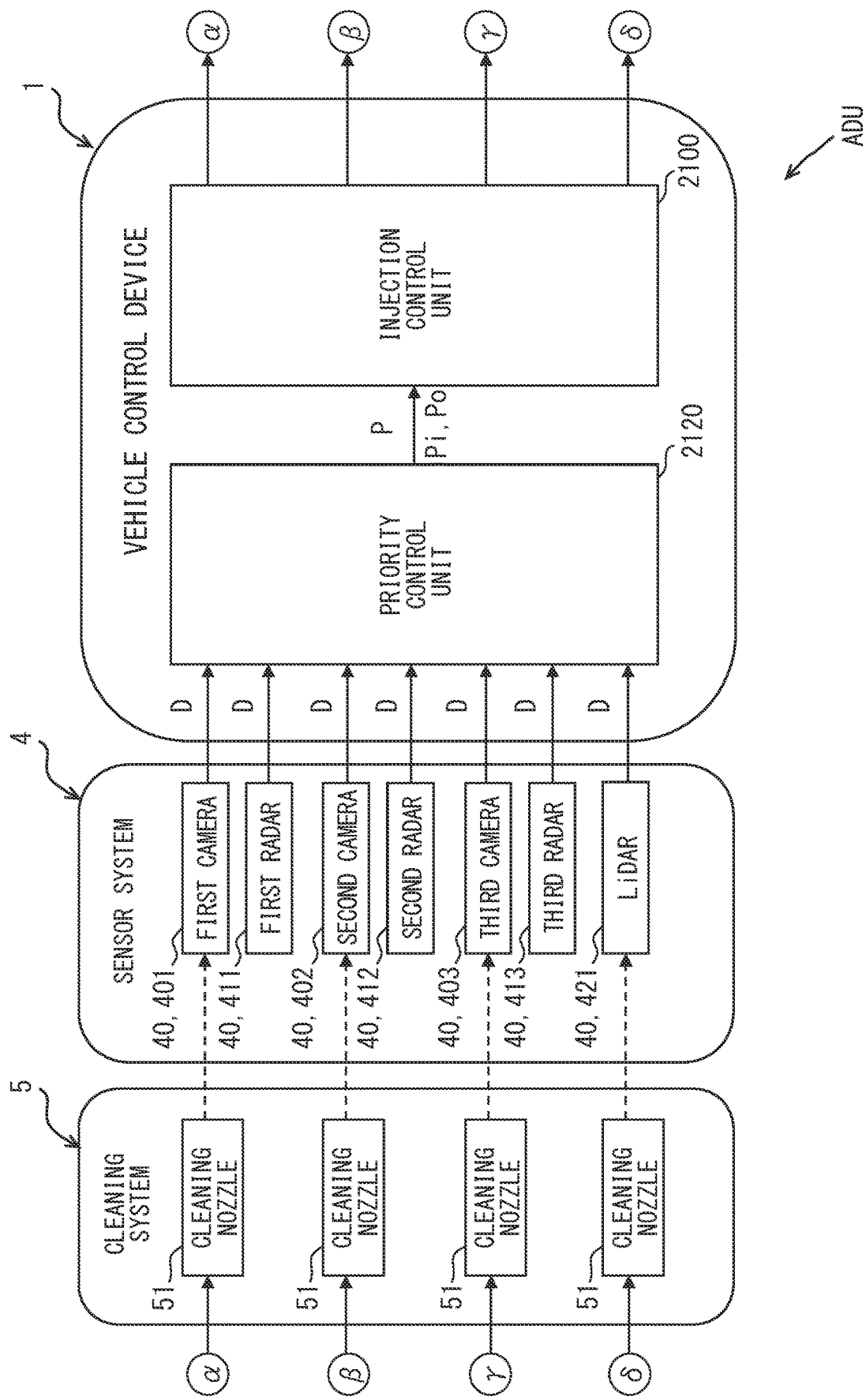
FIG. 8 is a block diagram showing a detailed configuration of an autonomous driving unit according to a second embodiment.

A second embodiment shown in FIG. 8 is a modification of the first embodiment.

A priority control unit 2120 of the second embodiment controls the priority P for each sensor data D, which is acquired through the external sensor 40 (excluding radars 411, 412, and 413) whose external surface 330 is to be cleaned. At this time, a priority control unit 2120 controls the priority P of each of the sensor data D according to, among the stain state of each of the external surfaces 330 to be cleaned and the motion state of the vehicle 2, at least the motion state, which is the latter.

Figure 9:
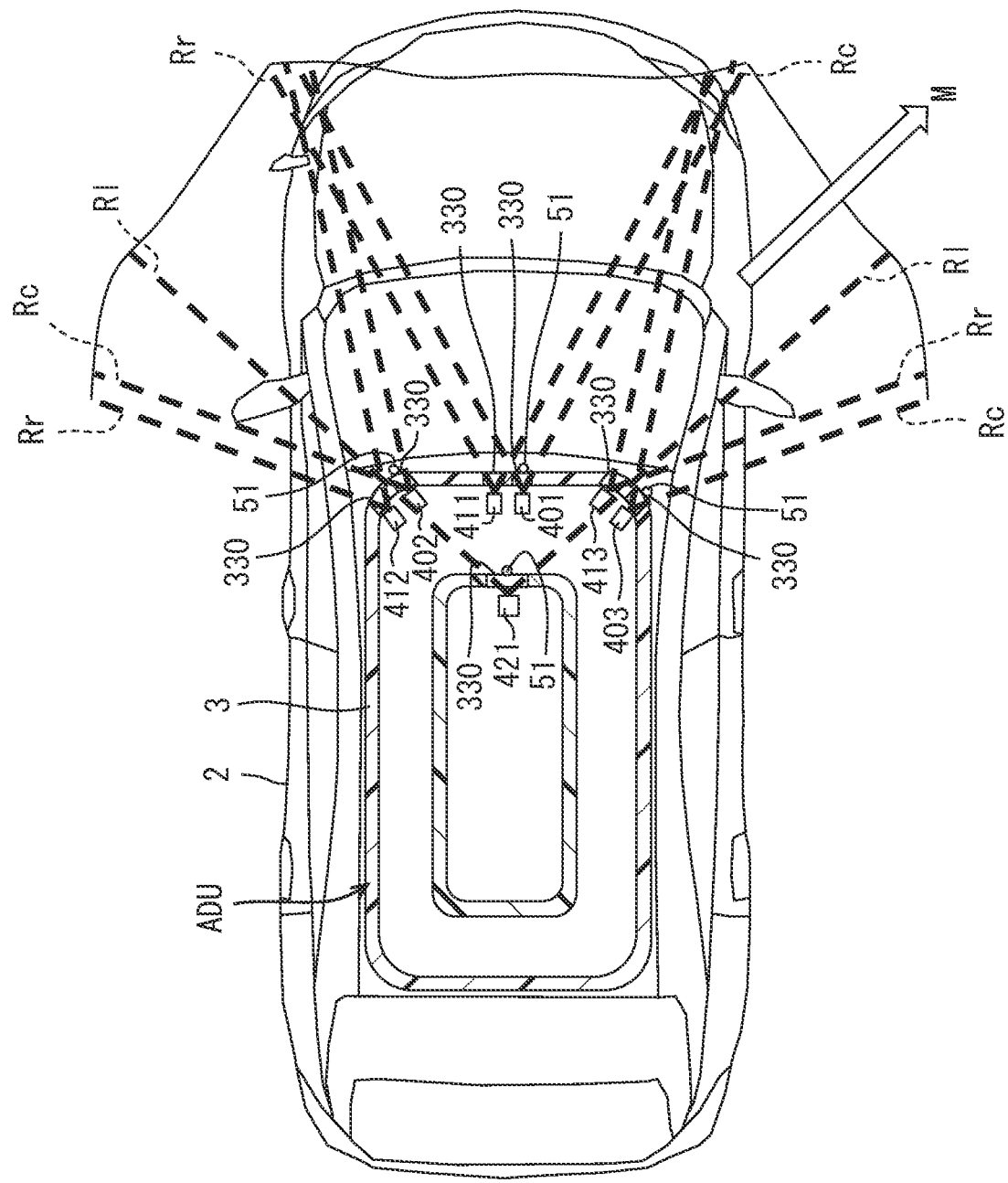
FIG. 9 is a schematic diagram for explaining functions of a vehicle control device according to the second embodiment.
Figure 10:
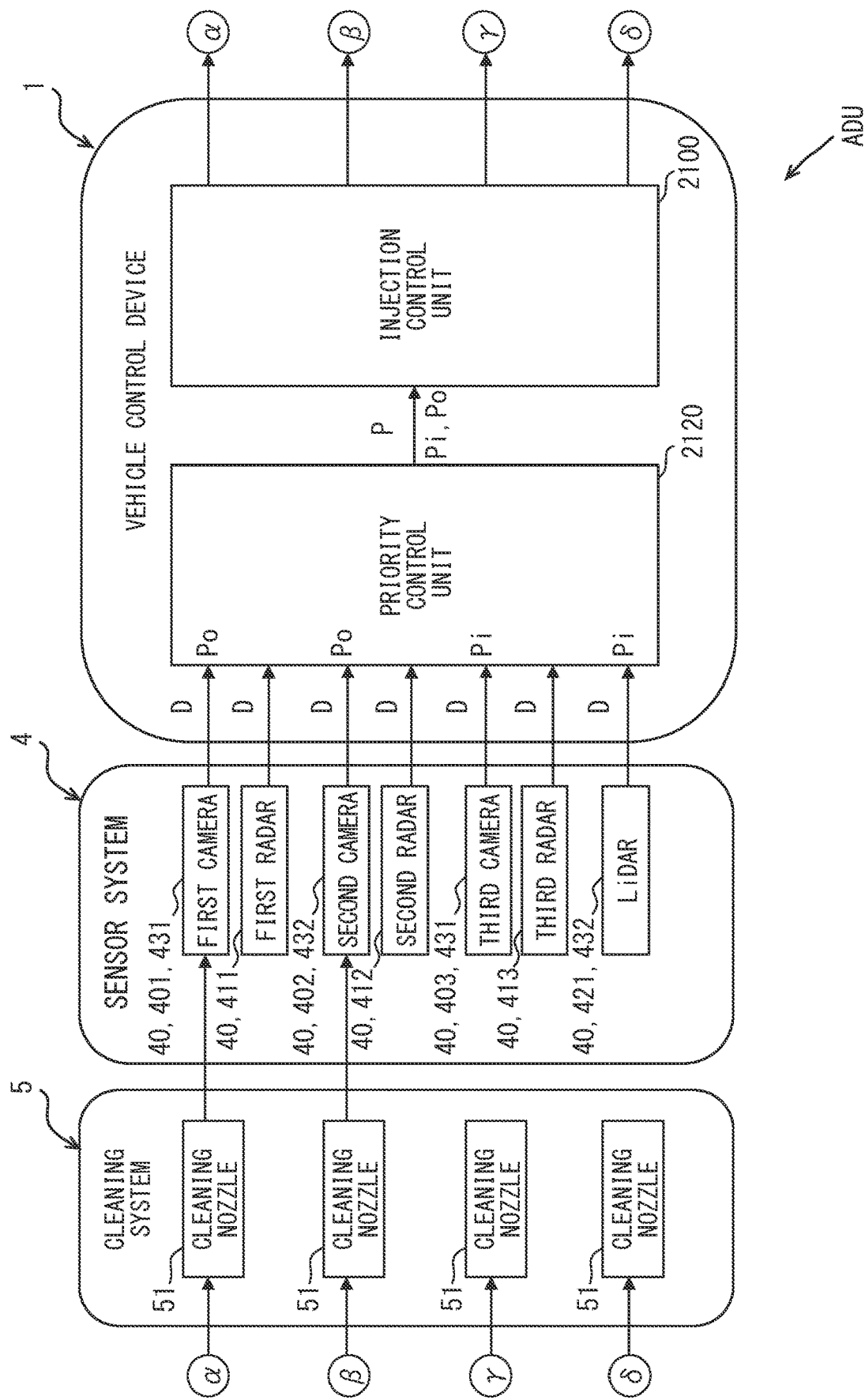
FIG. 10 is a block diagram for explaining functions of the vehicle control device according to the second embodiment.

Therefore, the priority control unit 2120 defines, as an inside region priority Pi shown in FIG. 10, the priority P of the sensor data D, which is acquired through the external sensors 40 whose sensing regions Rc and RI cover a motion direction M of the vehicle 2 as shown in FIG. 9. Further, the priority control unit 2120 defines, as an outside region priority Po shown in FIG. 10, the priority P of the sensor data D, which is acquired through the external sensors 40 whose sensing regions Rc and RI are away from the motion direction M of the vehicle 2 as shown in FIG. 9. Herein, the movement direction M may be, for example, along a direction, in which the external surfaces 330 are directed from starting points of the sensing regions Rc and RI of the external sensors 40 to be cleaned in a direction of the front steering wheels. The movement direction M may be along a motion vector direction of the vehicle 2 from the starting points.

Under these definitions, the priority control unit 2120 controls the inside region priority Pi to be higher than the outside region priority Po. At this time, the priority control unit 2120 may control the outside region priority Po to zero (e.g., 0%) and may control the inside region priority Pi to be higher than zero (e.g., 100%).

For example, under the condition shown in FIGS. 9, 10, the motion direction M of the vehicle 2 in a state of turning rightward is inside the sensing regions Rc and RI of the third camera 403 and the LiDAR 421 and is outside the sensing regions Rc of the first and second cameras 401 and 402. Therefore, the inside region priority Pi of the sensor data D, which is acquired through the third camera 403 and the LiDAR 421 is set to a value such as 100%. Accordingly, the outside region priority Po of the sensor data D, which is acquired through the first and second cameras 401, 402, is set to a value less than 100%, such as 0%. These settings control the inside region priority Pi of the sensor data D, which is acquired through the third camera 403 and LiDAR 421, to be higher than the outside region priority Po of the sensor data D, which is acquired through the first and second cameras 401 and 402. It is noted that, the outside region priority Po may be set, instead of the inside region priority Pi, for at least one of the third camera 403 and the LiDAR 421 having the sensing regions Rc and RI, inside which the motion direction M resides, when stain is detected on the external surface 330 of the at least one based on, for example, a change in the recognition rate of the sensor data D larger than a threshold or the change in the recognition rate larger than or equal to the threshold.

In this way, the inside region priority Pi and the outside region priority Po are controlled. Thus, in the autonomous driving control mode, the sensor data D, which is assigned with the inside region priority Pi, is utilized with priority over the sensor data D, which is assigned with the outside region priority Po. The priorities Pi and Po may also be contributions of the sensor data D in the autonomous driving control mode. That is, in the autonomous driving control mode, the contribution of the sensor data D assigned with the outside priority Po is lower than the contribution of the sensor data D assigned with the inside priority Pi. In particular, when the outside priority Po is controlled to zero, the contribution of the sensor data D assigned with the outside priority Po to the autonomous driving control mode is also zero. In addition, utilization of the sensor data D, which is assigned with the outside region priority Po is regulated, or the sensor data D assigned with the outside region priority Po is discarded.

As shown in FIG. 8, an injection control unit 2100 of the second embodiment acquires the control result of the priority P, which includes the inside region priority Pi and the outside region priority Po, from the priority control unit 2120. The injection control unit 2100 classifies the external sensors 40, which correspond to the external surfaces 330 to be cleaned, into a high priority sensor 431, which sends the sensor data D with the high priority P, and a low priority sensor 432, which sends the sensor data D with the low priority P. That is, the injection control unit 2100 classifies the external sensors 40 into the high priority sensor 431, which is assigned with the inside region priority Pi, and the low priority sensor 432, which is assigned with the outside region priority Po. The injection control unit 2100 stops injection of the cleaning fluid from the cleaning nozzle 51 corresponding to the external surface 330 of the high priority sensor 431, and continually or intermittently performs injection of the cleaning fluid from the cleaning nozzle 51 corresponding to the external surface 330 of the low priority sensor 432.

Figure 11:
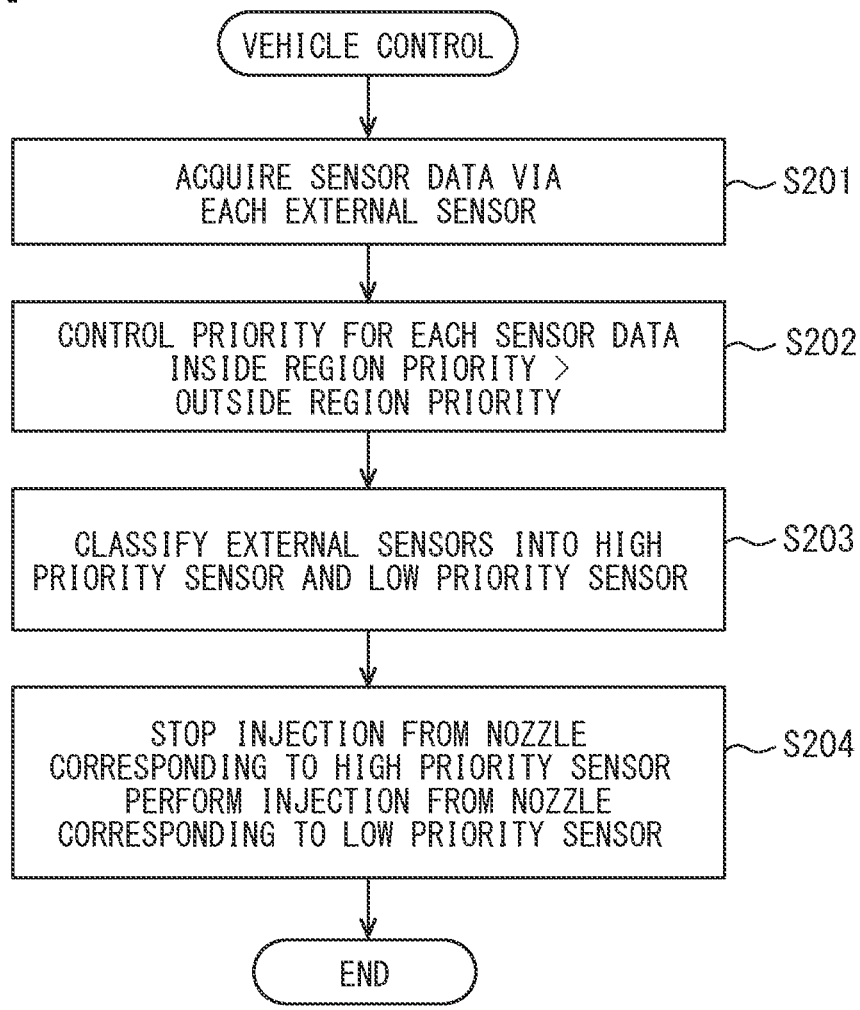
FIG. 11 is a flow chart showing a vehicle control method according to the second embodiment.

The flow of the vehicle control method jointly performed by the priority control unit 2120 and the injection control unit 2100 will be described below with reference to FIG. 11. This flow is also repeatedly executed when the vehicle 2 is in the activated state. Each "S" in this flow represents a plurality of steps executed by a plurality of instructions included in the vehicle control program of the second embodiment.

In S201, the priority control unit 2120 acquires the sensor data D through each of the external sensors 40, which corresponds to the external surface 330 to be cleaned. At S202, the priority control unit 2120 controls the priority P for each sensor data D as acquired. At this time, the priority control unit 2120 controls the priority P of each sensor data D according to at least the driving state of the vehicle 2. In particular, the priority control unit 2120 controls the inside region priority Pi of the sensor data D, which is acquired through the external sensor 40 whose sensing region Rc and RI covers the motion direction M of the vehicle 2, is to be higher than the outside region priority Po of the sensor data D, which is acquired through the external sensor 40 whose sensing region Rc and RI is away from the motion direction M of the vehicle 2. When the outside priority Po is controlled to zero in S202, acquisition of the sensor data D, which is assigned with the outside region priority Po, may be canceled in advance in S201.

In S203, the injection control unit 2100 classifies the external sensors 40, which correspond to the external surfaces 330 to be cleaned, into the high priority sensor 431, which sends the sensor data D with the high priority P, and the low priority sensor 432, which sends the sensor data D with the low priority P. At this time, in particular, the injection control unit 2100 distinguishes between the high priority sensor 431, which is assigned with the inside region priority Pi, and the low priority sensor 432, which is assigned with the outside region priority Po. Furthermore, in S204, the injection control unit 2100 stops injection of the cleaning fluid from the cleaning nozzle 51 corresponding to the external surface 330 of the high priority sensor 431, and performs injection of the cleaning fluid from the cleaning nozzle 51 corresponding to the external surface 330 of the low priority sensor 432.

In the second embodiment, S201 and S202 correspond to the priority control process, and S203 and S204 correspond to the injection control process.

(Operation Effect)

The operation and effect of the second embodiment will be described below.

In the second embodiment, the priority P is controlled for each sensor data D, which is acquired through the external sensor 40 (excluding the radars 411, 412, and 413 not to be cleaned), according to the driving state of the vehicle 2. In this way, the priority P becomes an index for classifying the external sensors 40. Injection of the cleaning fluid is stopped for the cleaning nozzle 51 corresponding to the external surface 330 of the high priority sensor 431, which is assigned with the priority of the sensor data D that is high. Injection of the cleaning fluid is performed for the cleaning nozzle 51 corresponding to the external surface 330 of the low priority sensor 432, which is assigned with the priority P of the sensor data D that is low. According to the injection control, it is possible to avoid the low priority sensor 432, which corresponds to the external surface 330 being cleaned with the cleaning fluid, from influencing the sensing accuracy of the sensor system 4 as a whole. The above configuration enables to ensure high sensing accuracy of the sensor system 4 as a whole by balancing the sensing and the cleaning.

According to the second embodiment, the priority P of the sensor data D, which is acquired through the external sensor 40 whose sensing region Rc and RI covers the motion direction M of the vehicle 2, is controlled to be higher than the priority P of the sensor data D, which is acquired through the external sensor 40 whose sensing region Rc and RI is away from the motion direction M of the vehicle 2. According to this configuration, the external sensor 40, which performs the sensing in the motion direction M of the vehicle 2, is classified as the high priority sensor 431. Thus, the high priority sensor 431, which corresponds to the external surface 330, on which cleaning with the cleaning fluid has stopped, is decisive for the sensing accuracy of the sensor system 4 as a whole. Therefore, it is possible to ensure high sensing accuracy of the sensor system 4 as a whole according to the motion state of the vehicle 2.

According to the second embodiment, in the autonomous driving control mode of the vehicle 2, the priority P of the sensor data D, which is acquired through the external sensor 40 whose external surface 330 is to be cleaned, is controlled. Therefore, in the second embodiment, with the configuration described above, the sensing accuracy of the entire sensor system 4 can be ensured, and the accuracy of the autonomous driving control can also be ensured.

Other Embodiments

Although a plurality of embodiments have been described above, the present disclosure is not to be construed as being restricted to these embodiments, and can be applied to various embodiments and combinations without departing from the gist of the present disclosure.

The dedicated computer of the vehicle control device 1 in a modification example may be at least one outside center computer communicating with the vehicle 2. The dedicated computer of the vehicle control device 1 of the modification example may include at least one of a digital circuit and an analog circuit as a processor. In particular, the digital circuit is at least one type of, for example, an ASIC (Application Specific Integrated Circuit), a FPGA (Field Programmable Gate Array), an SOC (System on a Chip), a PGA (Programmable Gate Array), a CPLD (Complex Programmable Logic Device), and the like. Such a digital circuit may include a memory in which a program is stored.

Figure 12:
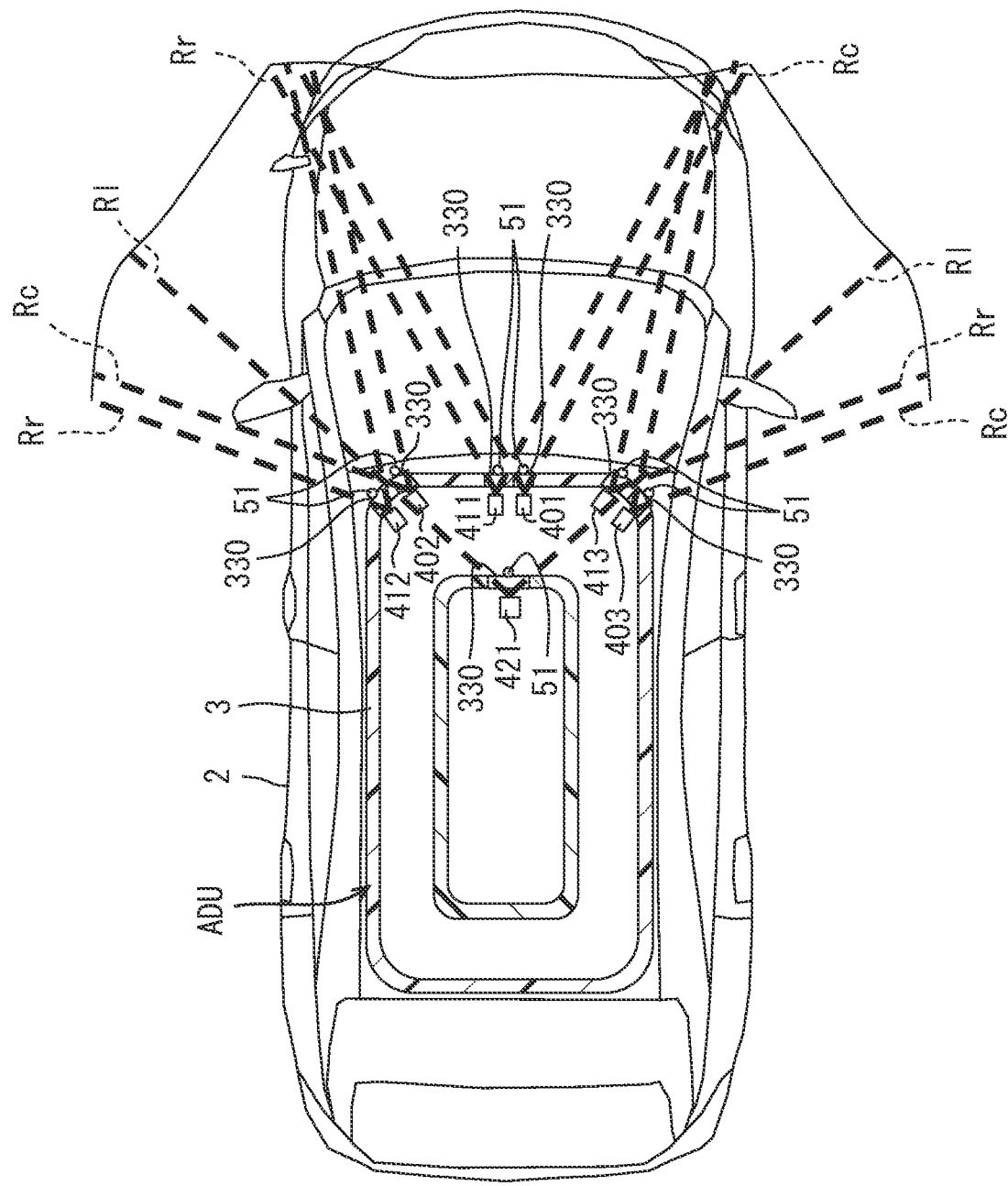
FIG. 12 is a schematic diagram for explaining functions of a vehicle control device according to a modification.

According to a modification, the priorities Pw, Pn, P, Pi, and Po may be controlled in a manual driving control mode, instead of or in addition to the autonomous driving control mode of the vehicle 2. According to a modification, the sensor cover 33 forming the external surface 330 may be provided on the external sensor 40 itself. According to a modification, the external surface 330 may be formed of an optical member such as a lens in the external sensor 40 itself. According to a modification shown in FIG. 12, the external surfaces 330 of the radars 411, 412, 413 may be cleaned by injecting the cleaning fluid from the cleaning nozzles 51. In this case, according to a modification of the first embodiment, when stain is detected on the external surface 330 corresponding to one of the radars 411, 412, and 413, the cleaning nozzle 51, which corresponds to the external surface 330 on which stain is detected, is classified as the injected nozzle 511. On the other hand, according to a modification of the second embodiment, the priority P of the sensor data D, which is acquired through one of the radars 411, 412, 413, whose sensing region Rr covers the motion direction M of the vehicle 2, is defined as the inside region priority Pi.

What is claimed is:

1. A control device for a vehicle, the vehicle including, as a sensor system, a plurality of external sensors individually set with sensing regions through external surfaces, the vehicle including, as a cleaning system, a plurality of cleaning nozzles configured to inject cleaning fluid to individually clean the external surfaces of the external sensors, the control device comprising:
    an injection control unit configured to
        perform classification of the cleaning nozzles, which correspond to the external surfaces whose sensing regions of the external sensors overlap with each other, into an injected nozzle, which performs injection of cleaning fluid, and a stopped nozzle, which stops injection of cleaning fluid, and
        control the classification according to a stain state of the external surface; and
    a priority control unit configured to control a priority of cleaned sensor data, which is acquired through an external sensor of the external sensors whose external surface corresponds to the injected nozzle, to be lower than a priority of non-cleaned sensor data, which is acquired through an external sensor of the external sensors whose external surface corresponds to the stopped nozzle.

2. The control device according to claim 1, wherein the priority control unit is configured to control the priority of the cleaned sensor data to zero.

3. The control device according to claim 1, wherein the priority control unit is configured to control at least one of the priority of the cleaned sensor data or the priority of the non-cleaned sensor data in an autonomous driving control mode of the vehicle.

4. An autonomous driving unit comprising:
    the control device according to claim 3;
    the sensor system including the external sensors; and
    the cleaning system including the cleaning nozzles.

5. A control method for a vehicle, the vehicle including, as a sensor system, a plurality of external sensors individually set with sensing regions through external surfaces, the vehicle including, as a cleaning system, a plurality of cleaning nozzles configured to inject cleaning fluid to individually clean the external surfaces of the external sensors, the control method comprising:
    performing classification of the cleaning nozzles, which correspond to the external surfaces whose sensing regions of the external sensors overlap with each other, into an injected nozzle, which performs injection of cleaning fluid and a stopped nozzle, which stops injection of cleaning fluid, and controlling the classification according to a stain state of the external surface in an injection control process; and
    controlling a priority of cleaned sensor data, which is acquired through an external sensor of the external sensors whose external surface corresponds to the injected nozzle, to be lower than a priority of non-cleaned sensor data, which is acquired through an external sensor of the external sensors whose external surface corresponds to the stopped nozzle, in a priority control process.

6. The control method according to claim 5, further comprising:
    controlling the priority of the cleaned sensor data to zero in the priority control process.

7. The control method according to claim 5, further comprising:
    controlling at least one of the priority of the cleaned sensor data or the priority of the non-cleaned sensor data in an autonomous driving control mode of the vehicle in the priority control process.

8. A storage medium storing a control program for a vehicle, the vehicle including, as a sensor system, a plurality of external sensors individually set with sensing regions through external surfaces, the vehicle including, as a cleaning system, a plurality of cleaning nozzles configured to inject cleaning fluid to individually clean the external surfaces of the external sensors, the control program including instructions to be executed by a processor, the instructions comprising:
    performing classification of the cleaning nozzles, which correspond to the external surfaces whose sensing regions of the external sensors overlap with each other, into an injected nozzle, which performs injection of cleaning fluid and a stopped nozzle, which stops injection of cleaning fluid and controlling the classification according to a stain state of the external surface in an injection control process; and controlling a priority of cleaned sensor data, which is acquired through an external sensor of the external sensors whose external surface corresponds to the injected nozzle, to be lower than a priority of non-cleaned sensor data, which is acquired through an external sensor of the external sensors whose external surface corresponds to the stopped nozzle in a priority control process.

9. The storage medium according to claim 8, the instructions further comprising:

controlling the priority of the cleaned sensor data to zero in the priority control process.

10. The storage medium according to claim 8, the instructions further comprising:

controlling at least one of the priority of the cleaned sensor data or the priority of the non-cleaned sensor data in an autonomous driving control mode of the vehicle in the priority control process.

\* \* \* \* \*